United States Patent
Wang et al.

(10) Patent No.: US 11,494,088 B2
(45) Date of Patent: Nov. 8, 2022

(54) PUSH-BASED PIGGYBACK SYSTEM FOR SOURCE-DRIVEN LOGICAL REPLICATION IN A STORAGE ENVIRONMENT

(71) Applicant: NetApp Inc., Sunnyvale, CA (US)

(72) Inventors: Xin Wang, Sewickley, PA (US); Vijay Deshmukh, Fremont, CA (US); Kiyoshi Komatsu, San Mateo, CA (US); Jonathan Curley, Pittsburgh, PA (US); Laura Beegle, Evans City, PA (US); Srishylam Simharajan, Cranberry Township, PA (US); Gurmeet Singh, Fremont, CA (US)

(73) Assignee: NetApp Inc., San Jose, CA (US)

( * ) Notice: Subject to any disclaimer, the term of this patent is extended or adjusted under 35 U.S.C. 154(b) by 306 days.

(21) Appl. No.: 16/774,175

(22) Filed: Jan. 28, 2020

(65) Prior Publication Data

US 2020/0159427 A1 May 21, 2020

Related U.S. Application Data

(63) Continuation of application No. 15/851,895, filed on Dec. 22, 2017, now Pat. No. 10,620,852, which is a continuation of application No. 14/587,419, filed on Dec. 31, 2014, now Pat. No. 9,916,100, which is a
(Continued)

(51) Int. Cl.
| | |
|---|---|
| *G06F 3/06* | (2006.01) |
| *G06F 16/27* | (2019.01) |
| *G06F 16/178* | (2019.01) |
| *G06F 16/182* | (2019.01) |
| *G06F 16/174* | (2019.01) |

(52) U.S. Cl.
CPC ............ *G06F 3/0619* (2013.01); *G06F 3/065* (2013.01); *G06F 3/067* (2013.01); *G06F 16/178* (2019.01); *G06F 16/1748* (2019.01); *G06F 16/184* (2019.01); *G06F 16/27* (2019.01)

(58) Field of Classification Search
CPC .... G06F 3/0619; G06F 16/27; G06F 16/1748; G06F 16/178; G06F 16/184; G06F 16/065; G06F 16/067
See application file for complete search history.

(56) References Cited

U.S. PATENT DOCUMENTS

| | | | |
|---|---|---|---|
| 7,039,663 B1 * | 5/2006 | Federwisch | ......... G06F 11/1451 |
| 7,991,750 B1 | 8/2011 | Xavier et al. | |
| 8,078,816 B1 | 12/2011 | Thoppai et al. | |

(Continued)

*Primary Examiner* — Hares Jami
(74) *Attorney, Agent, or Firm* — Cooper Legal Group, LLC

(57) ABSTRACT

The disclosed techniques enable push-based piggybacking of a source-driven logical replication system. Logical replication of a data set (e.g., a snapshot) from a source node to a destination node can be achieved from a source-driven system while preserving the effects of storage efficiency operations (deduplication) applied at the source node. However, if missing data extents are detected at the destination, the destination has an extent pulling problem as the destination may not have knowledge of the physical layout on the source-side and/or mechanisms for requesting extents. The techniques overcome the extent pulling problem in a source-driven replication system by introducing specific protocols for obtaining missing extents within an existing replication environment by piggybacking data pushes from the source.

20 Claims, 13 Drawing Sheets

Related U.S. Application Data continuation of application No. 13/715,560, filed on Dec. 14, 2012, now Pat. No. 8,930,311.

(56) References Cited

U.S. PATENT DOCUMENTS

| | | |
|---|---|---|
| 8,930,311 B1 | 1/2015 | Wang et al. |
| 2003/0220935 A1* | 11/2003 | Vivian .................... G06F 16/27 |
| 2004/0078824 A1 | 4/2004 | Krisbergh et al. |
| 2005/0078678 A1 | 4/2005 | Kim et al. |
| 2007/0083531 A1 | 4/2007 | Hussain |
| 2008/0082632 A1 | 4/2008 | Inagaki |
| 2009/0006920 A1* | 1/2009 | Munson ................. H04L 1/1858 |
| | | 714/748 |
| 2009/0319772 A1 | 12/2009 | Singh et al. |
| 2010/0115182 A1* | 5/2010 | Murugesan ......... G06F 12/0246 |
| | | 711/159 |
| 2012/0089574 A1 | 4/2012 | Doerner |
| 2013/0054524 A1* | 2/2013 | Anglin .................... G06F 16/27 |
| | | 707/624 |
| 2013/0325803 A1* | 12/2013 | Akirav ................. G06F 11/1464 |
| | | 707/634 |
| 2014/0019412 A1* | 1/2014 | Moollard ............ G06F 11/1453 |
| | | 707/610 |

* cited by examiner

PUSH-BASED PIGGYBACK SYSTEM FOR SOURCE-DRIVEN LOGICAL REPLICATION IN A STORAGE ENVIRONMENT

This application is a continuation of and claims priority to U.S. patent application Ser. No. 15/851,895, titled "PUSH-BASED PIGGYBACK SYSTEM FOR SOURCE-DRIVEN LOGICAL REPLICATION IN A STORAGE ENVIRONMENT" and filed on Dec. 22, 2017, which is a continuation of and claims priority to U.S. Pat. No. 9,916,100, titled "PUSH-BASED PIGGYBACK SYSTEM FOR SOURCE-DRIVEN LOGICAL REPLICATION IN A STORAGE ENVIRONMENT" and filed on Dec. 31, 2014, which is a continuation of and claims priority to U.S. Pat. No. 8,930,311, titled "PUSH-BASED PIGGYBACK SYSTEM FOR SOURCE-DRIVEN LOGICAL REPLICATION IN A STORAGE ENVIRONMENT" and filed on Dec. 14, 2012, which are incorporated herein by reference.

FIELD OF THE INVENTION

At least one embodiment of the present invention pertains to data storage systems, and more particularly, to techniques for piggybacking source-driven logical replication in a storage environment.

BACKGROUND

A network storage controller is a processing system that is used to store and retrieve data on behalf of one or more hosts on a network. A storage controller operates on behalf of one or more hosts to store and manage data in a set of mass storage devices, such as magnetic or optical storage-based disks or tapes. Some storage controllers are designed to service file-level requests from hosts, as is commonly the case with file servers used in network attached storage (NAS) environments. Other storage controllers are designed to service extent-level requests from hosts, as with storage controllers used in a storage area network (SAN) environment. In this description, the term "data extent," or simply "extent," is henceforth used to refer to the smallest unit of user data that is independently identified and manipulated by a file system in a storage system. The term "data extent" or simply "extent" is essentially synonymous with the term "data block" or simply "block" for purposes of this description.

Still other storage controllers are capable of servicing both file-level requests and extent-level requests, as is the case with certain storage controllers made by NetApp, Inc. of Sunnyvale, Calif.

One common application of storage controllers is data replication. Mirroring is a form of replication, in which a given data set at a source is replicated "exactly" (at least insofar as its users can see) at a destination, which is often geographically remote from the source. The replica data set created at the destination is called a "mirror" of the original data set. Mirroring typically involves the use of at least two storage controllers, e.g., one at the source and another at the destination, which communicate with each other through a computer network or other type of data interconnect to create the mirror.

When replicating a data set, such as a volume, the replica usually does not need to be an exact copy of the original; however, it should be close enough in its outward appearance to its users so that it is effectively the same as the original. In many storage systems, files and directories are a major part of what a user sees when looking at a volume. However, a volume usually also has other properties that can impact replication, such as how much space it occupies. A storage administrator is often concerned with these other properties, because provisioning adequate storage capacity is one of a storage administrator's main responsibilities.

Storage efficiency techniques such as compression and data extent sharing for deduplication can enable a volume effectively to hold far more data than the space it actually uses. Unless this efficiency is preserved during replication, however, a resulting replica may inflate to an intolerably large size and may require an inordinate amount of time to transfer from source to destination. In extreme but plausible cases, it may not be possible to create a replica at all, due to such data inflation. Yet preserving storage efficiency attributes such as extent sharing and compression across replicas has proven to be a significant challenge.

Additionally, the replication systems that are typically capable of preserving storage efficiency are source-driven replication systems. Generally, source-driven replication systems are more efficient when data extent sharing because the source side can read data from its volumes in a logical manner (i.e., via one or more logical extent pointers). Conversely, the destination side may not have knowledge of the physical layout of the source-side, and thus requesting missing data extents can be a challenge.

Missing data extents can occur in various scenarios. For example, if a "Zombie" condition exists on the source side then some deleted extents are still captured in a snapshot. These deleted extents confuse the replication engine causing the replication engine not to send active (i.e., non-deleted) extents. Unfortunately, obtaining these missing data extents at the destination in a source-driven replication system has proven to be a significant challenge.

SUMMARY

This summary is provided to introduce certain concepts in a simplified form. The concepts are further described in the Detailed Description below and the drawings. This summary is not intended to identify essential features of the claimed subject matter or to limit the scope of the claimed subject matter.

The techniques introduced herein enable push-based piggybacking of a source-driven logical replication system. Logical replication of a data set (e.g., a snapshot) from a source node to a destination node can be achieved from a source-driven system while preserving the effects of storage efficiency operations (deduplication) applied at the source node. However, if missing data extents are detected at the destination, the destination may have a problem pulling the missing extent(s) from the source, since the destination may not have knowledge of the physical layout on the source-side and/or mechanisms for requesting extents. The piggybacking techniques described herein overcome the extent pulling problem in a source-driven replication system by introducing specific protocols for obtaining missing extents within an existing replication environment.

In one embodiment, the technique includes identifying one or more missing data extents at the destination and sending a notification of the missing extent names to a source via a push inquiry response. The push inquiry response causes the source to initiate a push of the missing extents for delivery to the destination. Once the missing extents are received at the destination node, the data set can be reconstructed at the destination.

Other aspects of the technique will be apparent from the accompanying figures and detailed description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
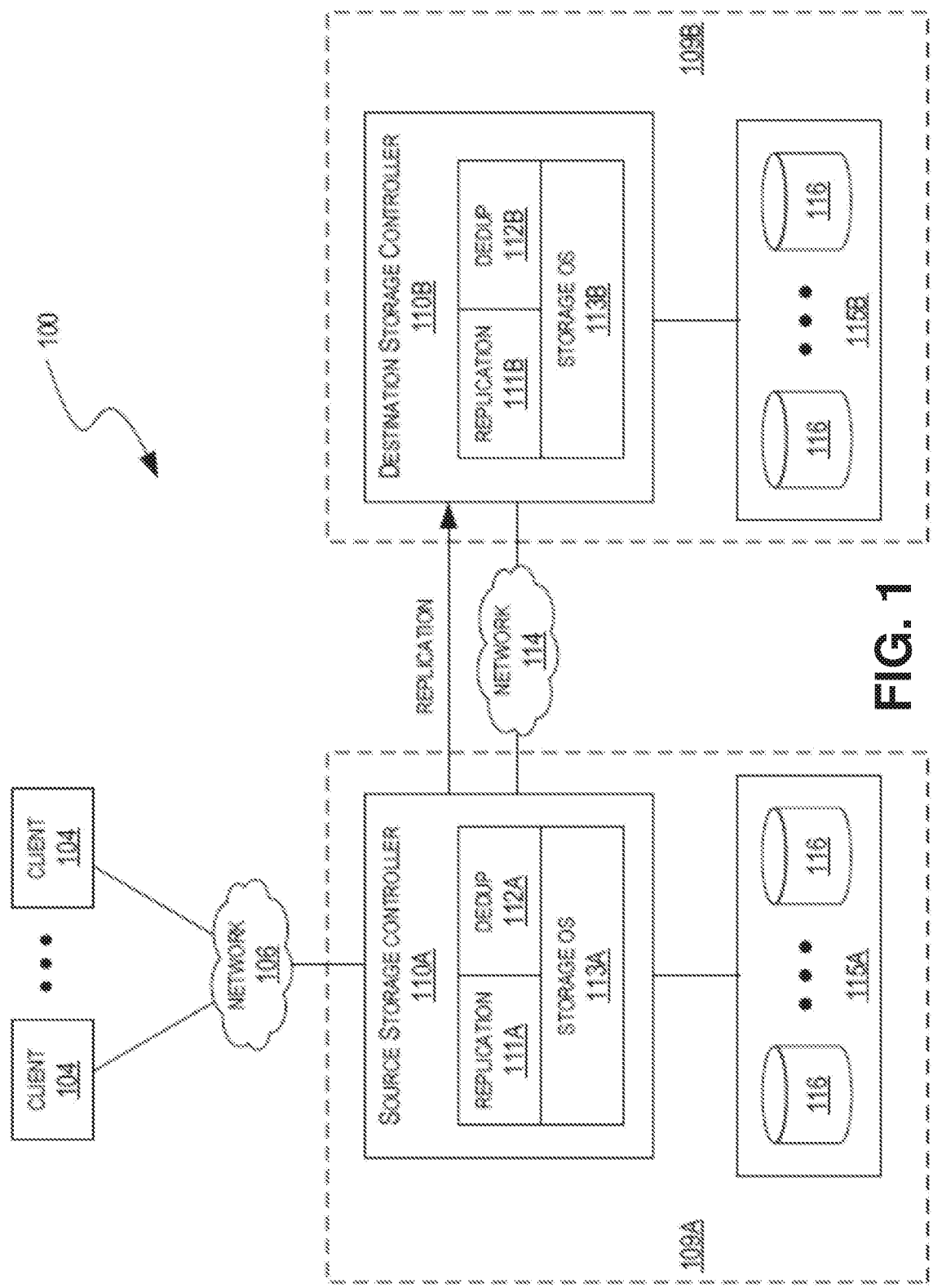
FIG. 1 shows a network storage environment in which the techniques introduced here can be implemented.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, such references are not necessarily mutually exclusive either.

Replication can be done at a physical extent level or at a logical extent level, the former being referred to as "physical replication" and the latter being referred to as "logical replication." To understand the difference, consider that in certain storage systems, each data extent in a given set of data (e.g., a file) can be represented by both a physical extent which is referenced by use of a physical extent pointer, and by a logical extent which is referenced by or otherwise pointed to by a corresponding logical extent pointer. The logical extent and the physical extent are actually the same extent. However, the physical extent pointer indicates the actual physical location of the data extent on a storage medium, whereas the logical extent pointer indicates the logical position of the data extent within the data set (e.g., a file) relative to other data extents.

In physical replication, the replica has the identical structure of logical extent pointers as the original data set but may (and typically does) have a different structure of physical extent pointers than the original data set. Conversely, in logical replication, the replica does not have the identical structure of logical extent pointers or the physical extent point as the original data set. These two different types of replication have different implications and consequences under certain conditions.

For various reasons it may be more desirable to perform logical replication in a given storage system rather than physical replication. For example, performing logical replication allows storage efficiency (or deduplication) performed at the source controller to be more easily preserved. That is, when logical replication is performed, it is more efficient that the replication be driven by the source controller (or node) because the file system on the source side does not share the same strict physical layout as the destination side. Additionally, with logical replication, the destination can have the flexibility to include more or less data (e.g., more or fewer snapshots).

Unfortunately, various conditions exist that can cause missing extents to exist in replicated data sets. These missing data sets are typically discovered during the logical reconstruction process on the destination side but the destination side does not have knowledge of or access to the file systems on the source side to pull the extents itself. Consequently, the embodiments described below illustrate techniques for piggybacking a source-driven logical replication system in a storage environment.

I. Overview

A. System Architecture

FIG. 1 shows a network storage environment 100 in which the techniques being introduced herein can be implemented. In FIG. 1 a source node 109A is coupled to a destination node 109B through a network (or interconnect) 114. The source node 109A includes source storage controller 110A coupled to a source storage subsystem 115A. The source node 109A is coupled to clients (or hosts) 104 through a network (or interconnect) 106. Networks 106 and 114 each can be, for example, a local area network (LAN), wide area network (WAN), metropolitan area network (MAN), global area network such as the Internet, a Fibre Channel fabric, or any combination of such interconnects. Each of the clients 104 may be, for example, a conventional personal computer (PC), server-class computer, workstation, handheld computing/communication device, or the like. Networks 106 and 114 can be, but are not necessarily, the same interconnect.

Storage of data in the source storage subsystem 115A is managed by source storage controller 110A. Source storage controller 110A and source storage subsystem 115A are collectively referred to as the source node 109A. Source storage controller 110A receives and responds to various read and write requests from the clients 104, related to data stored in, or to be stored in, storage subsystem 115A. Storage subsystem 115A includes a number of nonvolatile mass storage devices 116, which can be, for example, conventional magnetic or optical disks or tape drives, nonvolatile solid-state memory such as flash memory or solid-state drives (SSDs), or any combination thereof. The mass storage devices 116 in storage subsystem 115A can be organized as a Redundant Array of Inexpensive Disks (RAID), in which case the storage controller 110A accesses the storage subsystem 115A using a RAID algorithm for redundancy.

Source storage controller 110A is connected to a destination storage controller 110B through interconnect 114 for purposes of mirroring (or otherwise replicating) data. Interconnect 114 may include one or more devices and/or networks. The source storage controller 110A includes a storage operating system 113A which is responsible for managing storage of data in the source storage subsystem 115A, servicing requests from clients 104, and performing various other storage related operations. The source storage controller 110A also includes a replication module 111A and a deduplication module 112A, which operate logically on top of the storage operating system 113A. The replication module 111A in the source storage controller 110A operates in cooperation with a remote replication module 111B in the destination storage controller 110B, to perform logical replication of data stored in the source storage subsystem 115A to destination storage system 115B. In other embodiments, one or both of the replication module 111A and the deduplication module 112A may be implemented as elements of storage operating system 113A.

The destination storage controller 110B includes storage operating system 113B to control storage related operations on the destination storage controller 110B, as well as replication module 111B and deduplication module 112B operating logically on top of storage operating system 113B. In other embodiments, one or both of the replication module 111B and the deduplication module 112B may be implemented as elements of storage operating system 113B. The destination storage controller 110B and the destination storage subsystem 115B collectively make up the destination node 109B.

Replication module 111B works in cooperation with replication module 111A to mirror data from the source to the destination.

Each of the various modules shown in FIG. 1 (i.e., storage operating systems 113A and 113B, replication modules 111A and 111B, and deduplication modules 112A and 112B) can be implemented in pure hardware (e.g., specially-designed dedicated circuitry such as one or more application-specific integrated circuits (ASICs)), or in programmable circuitry appropriately programmed with software and/or firmware, or in a combination of pure hardware and programmable circuitry.

Storage controllers 110A and 110B each may be, for example, a storage server that provides file-level data access services to hosts, such as commonly done in a NAS environment, or extent-level data access services such as commonly done in a SAN environment, or both file-level and extent-level data access services to hosts. Further, although the storage controller 110A or 110B is illustrated as a single unit in FIG. 1, it can have a distributed architecture. For example, a storage controller 110A or 110B can be designed in the form of a physically separate network module (e.g., "N-blade") and disk module (e.g., "D-blade") (not shown), which communicate with each other over a physical interconnect. Such an architecture allows convenient scaling, such as by deploying two or more N-modules and two or more D-modules, all capable of communicating with each other through the interconnect.

Figure 2:
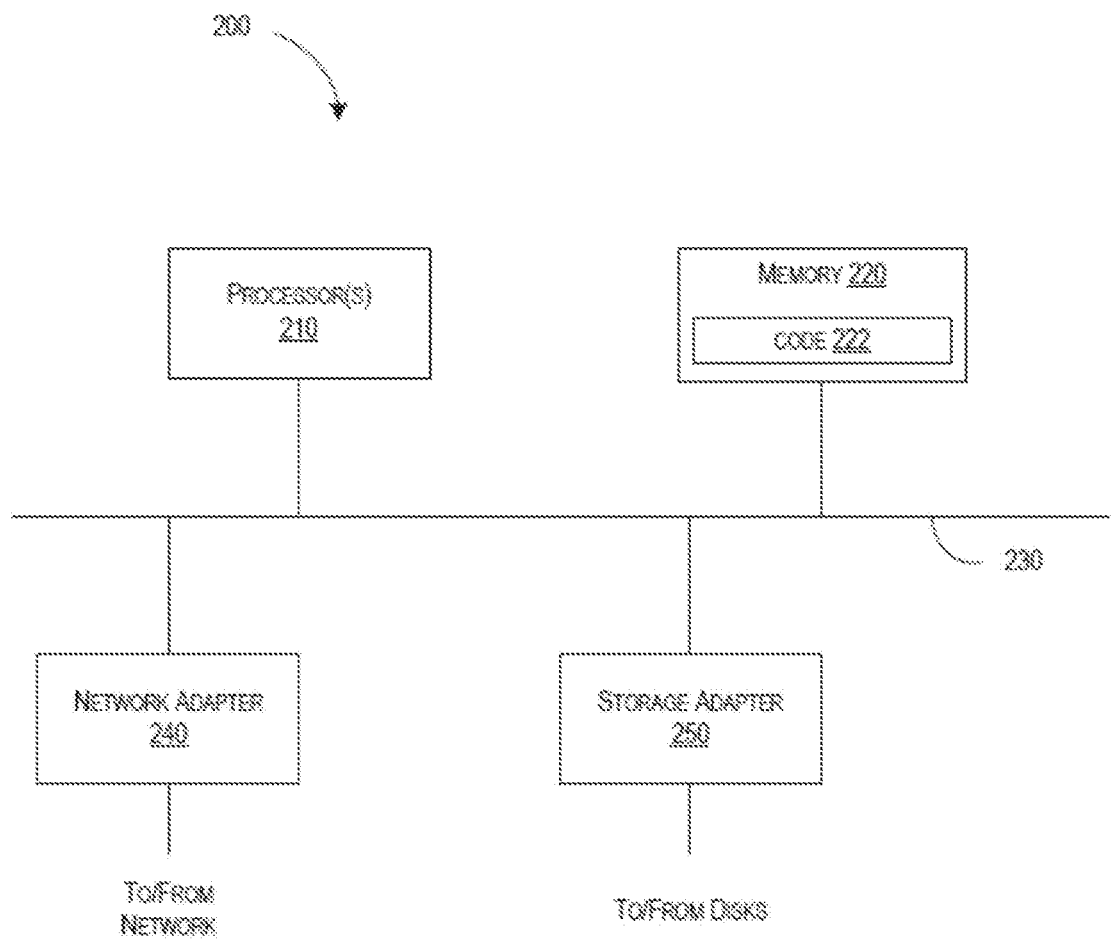
FIG. 2 is a diagram showing an example of the architecture of a storage controller.

FIG. 2 is a high-level extent diagram showing an example of the architecture of a storage controller 200, which can represent storage controller 110A or 110B. The storage controller 200 includes one or more processors 210 and memory 220 coupled to an interconnect 230. The interconnect 230 shown in FIG. 2 is an abstraction that represents any one or more separate physical buses, point-to-point connections, or both, connected by appropriate bridges, adapters, or controllers. The interconnect 230, therefore, may include, for example, a system bus, a form of Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire", and/or any other suitable form of physical connection.

The processor(s) 210 is/are the central processing unit (CPU) of the storage controller 200 and, thus, control the overall operation of the storage controller 200. In certain embodiments, the processor(s) 210 accomplish this by executing software or firmware stored in memory 220. The processor(s) 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 220 is or includes the main memory of the storage controller 200. The memory 220 represents any form of random access memory (RAM), read-only memory (ROM), flash memory, or the like, or a combination of such devices. In use, the memory 220 may contain, among other things, software or firmware code 222 for use in implementing at least some of the techniques introduced herein.

Also connected to the processor(s) 210 through the interconnect 230 are a network adapter 240 and a storage adapter 250. The network adapter 240 provides the storage controller 200 with the ability to communicate with remote devices, such as clients 104 of FIG. 1, over the network 106 and may be, for example, an Ethernet adapter or Fibre Channel adapter. The storage adapter 250 allows the storage controller 200 to access a storage subsystem, such as storage subsystem 115A or 115B, and may be, for example, a Fibre Channel adapter or SCSI adapter.

Figure 3:
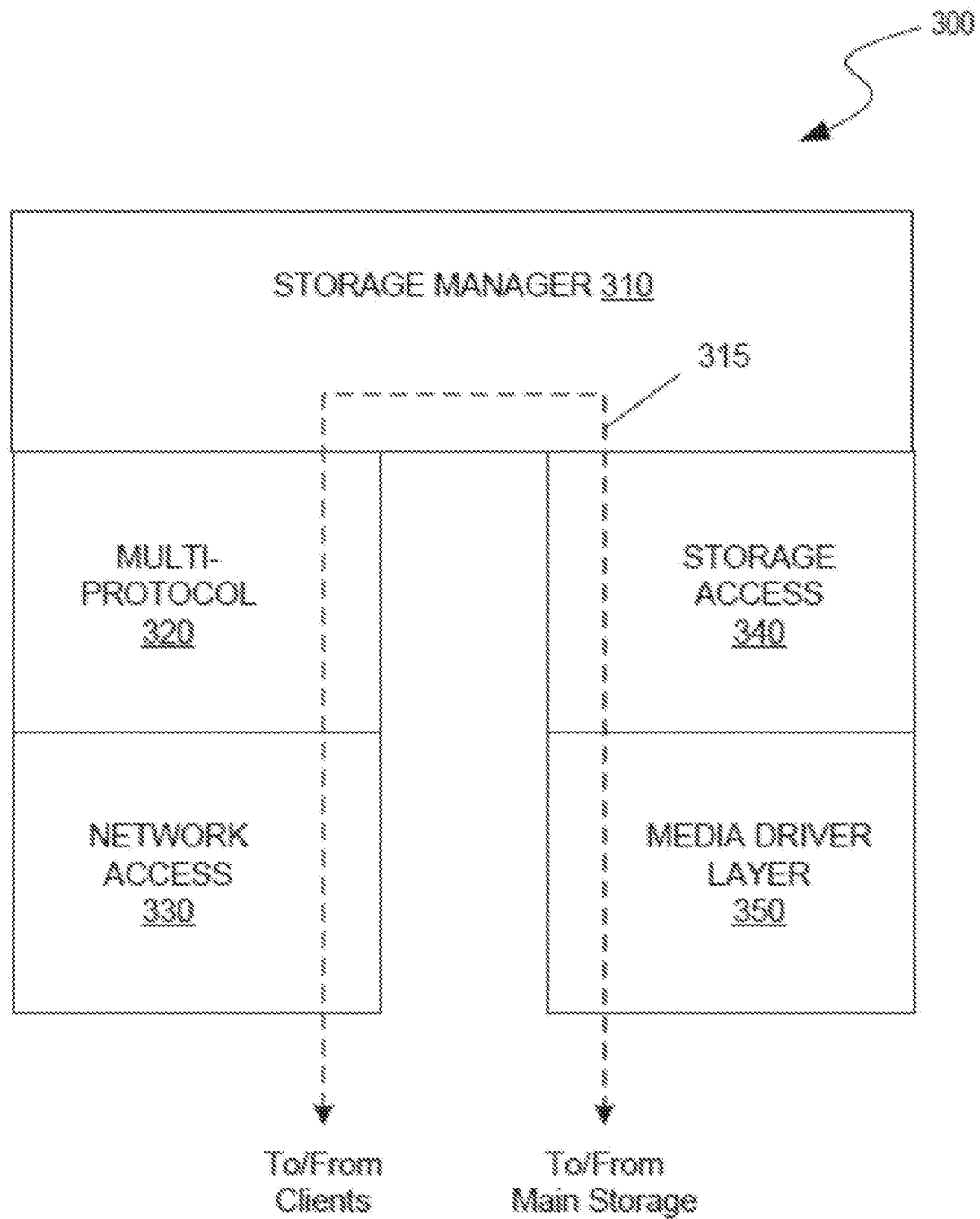
FIG. 3 is a functional diagram illustrating the elements of a storage operating system.

FIG. 3 illustrates an example of a storage operating system, which may represent storage operating system 113A or 113B. In the embodiment shown in FIG. 3, the storage operating system 300 includes several modules, or "layers". These layers include a storage manager 310, which is the core functional element of the storage operating system 300. The storage manager 310 imposes a structure (e.g., a hierarchy) on the data managed by its host storage server, and services read and write requests from clients. In one embodiment, the storage operating system can be the NetApp® Data ONTAP™ operating system available from NetApp, Inc., Sunnyvale, Calif. that implements a Write Anywhere File Layout (WAFL™) file system. However, another storage operating system may alternatively be designed or enhanced for use in accordance with the techniques described herein.

To allow the storage server to communicate over a network (e.g., with clients), the storage operating system 300 also includes a multi-protocol layer 320 and a network access layer 330, which operate logically "under" the storage manager 310. The multi-protocol 320 layer implements various higher-level network protocols, such as Network File System (NFS), Common Internet File System (CIFS), Hypertext Transfer Protocol (HTTP), Internet small computer system interface (iSCSI), and backup/mirroring protocols. The network access layer 330 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

To allow the storage server to communicate with a local storage subsystem, the storage operating system 300 includes a RAID layer 340 and an associated storage driver layer 350, logically under the storage manager 310. The RAID layer 340 implements a higher-level RAID algorithm, such as RAID-4, RAID-5, RAID-6 or RAID-DP. The storage driver layer 350 implements a lower-level storage device access protocol, such as Fibre Channel Protocol (FCP) or small computer system interface (SCSI). Also shown is the data path 315 between the clients (e.g., client 104 of FIG.) and storage devices (e.g., storage subsystems 115).

In the illustrated embodiment, the storage operating system 300 is shown as being monolithic in architecture. In alternative embodiments, however, the storage operating system 300 could have a distributed architecture. For example, storage manager, 310, the RAID layer 340 and the storage drivers 350 could be combined into a module or blade (e.g., a "D-blade") that is responsible for data management functions, while the multi-protocol layer 320 and the network access layer 330 are grouped into another module or blade (e.g., "N-blade") that is responsible for network communications. In such an embodiment, the N-module and the D-module can communicate through a special-purpose communication link and protocol. Each of the above-mentioned components of the storage operating system 300 can be implemented in the form of special-purpose hardware (circuitry), programmable circuitry, or a combination thereof.

B. File System Structure and Functionality

It is useful now to consider how data can be structured and organized in a file system by storage controllers 110A and 110B according to certain embodiments. The term "file system" is used herein only to facilitate description and does not imply that the stored data must be stored in the form of "files" in a traditional sense; that is, a "file system" as the term is used herein can store data as extents, logical units (LUNs) and/or any other type(s) of units.

In at least one embodiment, data is stored in the form of volumes. A "volume" is a set of stored data associated with a collection of mass storage devices, such as disks, which obtains its storage from (i.e., is contained within) an aggregate, and which is managed as an independent administrative unit, such as a complete file system. Each volume can contain data in the form of one or more directories, subdirectories, qtrees, files and/or files. An "aggregate" is a pool of storage, which combines one or more physical mass storage devices (e.g., disks) or parts thereof into a single logical storage object. An aggregate contains or provides storage for one or more other logical data sets at a higher level of abstraction, such as volumes. A "qtree" is special type of directory that has a storage space limit or quota associated with it.

In certain embodiments, an aggregate uses a physical volume block number (PVBN) address space that defines the storage space of data extents provided by the storage devices of the physical volume, and each volume uses a virtual volume block number (VVBN) address space to organize those extents into one or more higher level objects, such as directories, subdirectories, qtrees and files. A PVBN, therefore, is an address of a physical extent in the aggregate. A VVBN is an address of an extent in a volume (the same extent as referenced by the corresponding PVBN), i.e., the offset of the extent within a file that represents the volume. Knowledge of all of the VVBNs and PVBNs is maintained by the storage operating system in each storage controller. Each VVBN space is an independent set of values that corresponds to locations within a directory, qtree or file, which are translated by the storage access layer 34 to device block numbers (DBNs) on a physical storage device.

Each volume can be a separate file system that is "mingled" with other volumes onto a common set of storage in the aggregate by the storage operating system. A RAID layer in the storage operating system 300 builds a RAID topology structure for the aggregate that guides each volume when performing write allocation. The RAID layer also presents a PVBN-to-DBN mapping to the storage manager 310.

In addition, the storage operating system maintains a logical extent number for each data extent. The logical extent numbers are called file block numbers (FBNs). Each FBN indicates the logical position of the extent within a file, relative to other extents in the file, i.e., the offset of the extent within the file. Note that the term "file" as used herein can mean any named logical container of data that can be composed of one or more smaller identifiable units of data, such as data extents. For example, FBN 0 represents the first logical extent in a file, FBN 1 represents the second logical extent in a file, FBN n−1 represents the nth logical extent in a file, etc. Note that the PVBN and VVBN of a data extent are independent of the FBN(s) that refer to that extent.

In certain embodiments, each file is represented in a storage controller on the form of a hierarchical structure called a "buffer tree". A buffer tree is a hierarchical structure used to store data and metadata of a file, including pointers for use in locating the data extents of the file. A buffer tree includes one or more levels of indirect data extents (called "L1 extents", "L2 extents", etc.), each of which contains one or more pointers to lower-level indirect extents and/or to the direct extents (called "L0 extents") of the file. All of the data in the file is stored only at the lowest level (L0) extents.

The root of a buffer tree is the "inode" of the file. An inode is a metadata container that is used to store metadata about the file, such as ownership, access permissions, file size, file type, and pointers to the highest level of indirect extents for the file. Each file has its own inode. The inode is stored in a separate inode file, which may itself be structured as a buffer tree.

Figure 4:
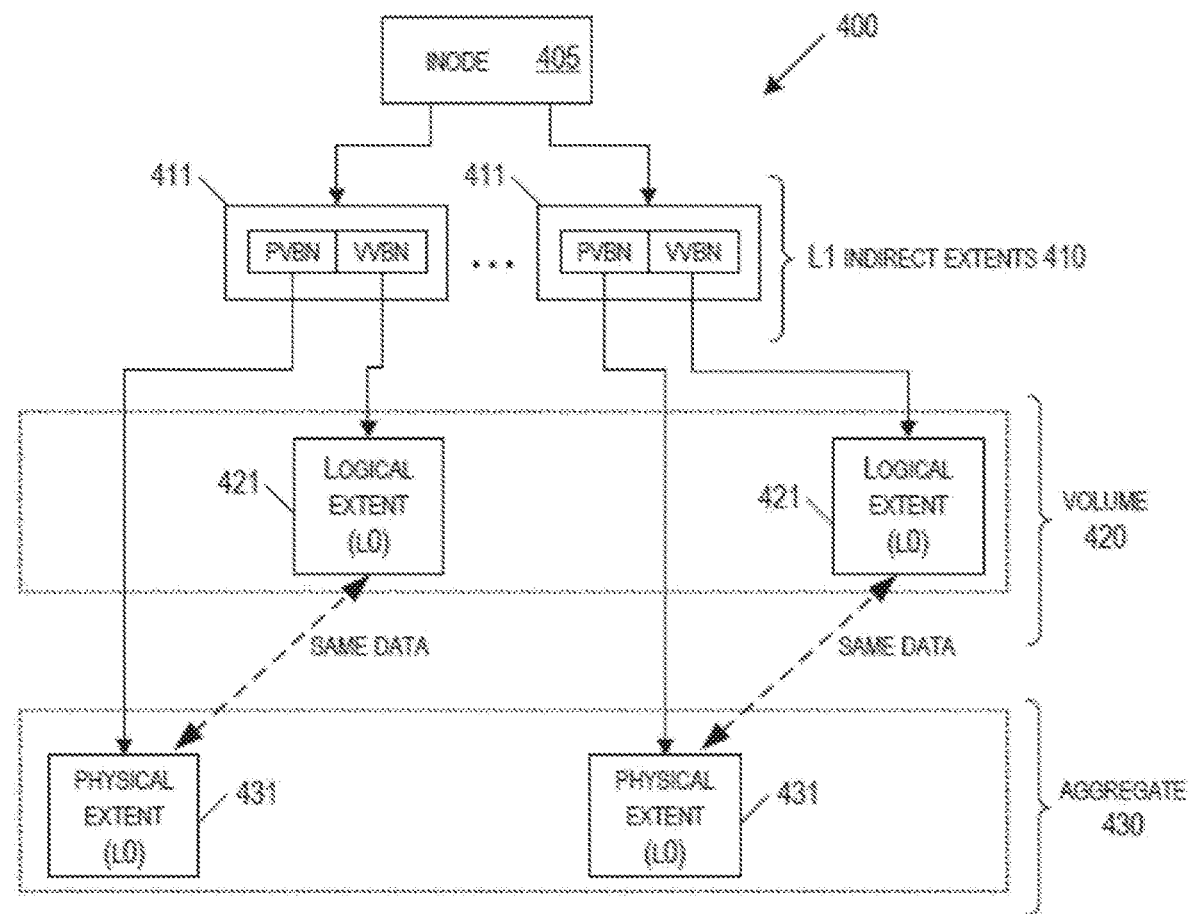
FIG. 4 shows an example of a buffer tree.

FIG. 4 shows an example of a buffer tree 400 of a file. The file is assigned an inode 405, which references Level 1 (L1) indirect extents 410. Each indirect extent 411 stores at least one PVBN and a corresponding VVBN for each PVBN. There is a one-to-one mapping between each VVBN and PVBN. Note that a VVBN is a logical extent number in a volume, which is a virtual number for addressing; but there is only one copy of the L0 data extent physically stored. Also, to simplify description, only one PVBN-VVBN pair is shown in each indirect extent 411 in FIG. 4; however, an actual implementation would likely include multiple/many PVBN-VVBN pairs in each indirect extent 411. Each PVBN references a physical extent 431 in a storage device (i.e., in the aggregate 430) and the corresponding VVBN represents the corresponding logical extent 421 in a file that represents the volume (called the "container file") 420. Physical extents 431 and logical extents 421 are actually the same L0 data for any particular PVBN-VVBN pair, however, they are accessed in different ways: The PVBN is accessed directly in the aggregate 430, while the VVBN is accessed virtually via the volume container file 420.

Figure 5:
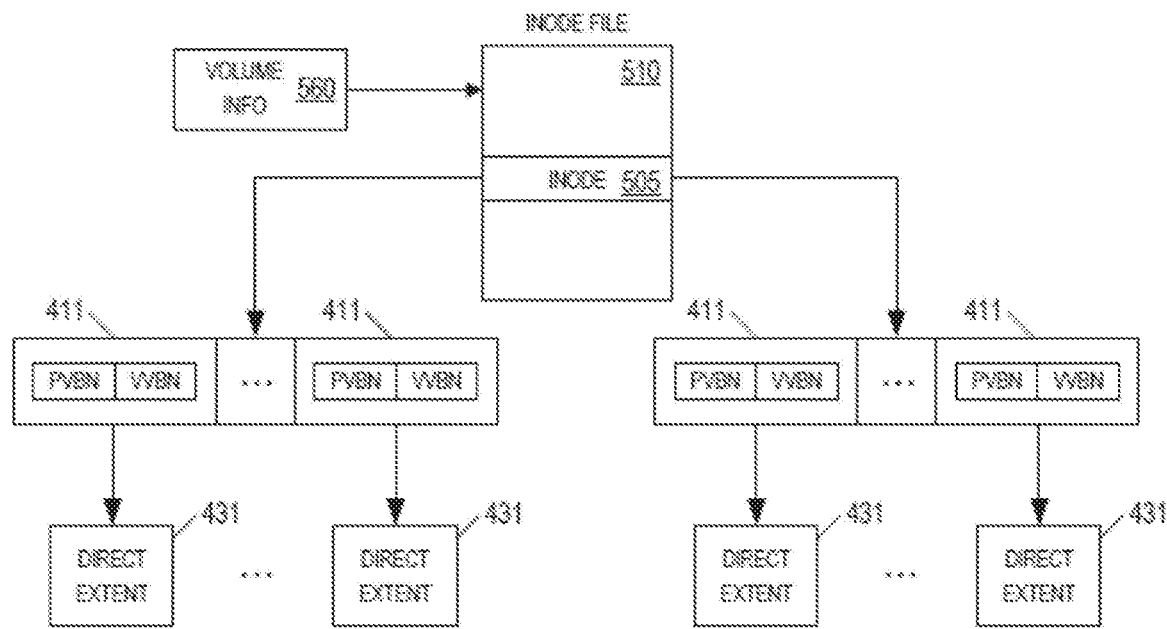
FIG. 5 shows the relationship between inodes, an inode file and a buffer tree.

Referring now to FIG. 5, for each volume managed by a storage server, the inodes of the files and directories in that volume are stored in a separate inode file 510. A separate inode file 510 is maintained for each volume. Each inode 505 in an inode file 510 is the root of a buffer tree of a corresponding file such as, for example, buffer tree 400. The location of the inode file 510 for each volume is stored in a Volume Information ("VolumeInfo") extent 560 associated with that volume. The VolumeInfo extent 560 is a metadata container that contains metadata that applies to the volume as a whole. Examples of such metadata include, for example, the volume's name, type, size, any space guarantees to apply to the volume, and the VVBN of the inode file of the volume.

In at least one conventional asynchronous data mirroring technique, the replication module first generates a persistent point-in-time image ("snapshot") of a data set to be replicated at the source (e.g., a qtree), and then sends that snapshot to the replication module; this data is referred to as the baseline, or baseline snapshot. Subsequently, from time to time, the replication module executes a mirror update process (which may be at the request of the replication module). To do so, the replication module takes an update snapshot of the data set, identifies any data extents (FBNs) that have been modified since the last snapshot, whichever is later, and sends those changed extents to the destination.

C. Extent Sharing (Deduplication)

Figure 6A:
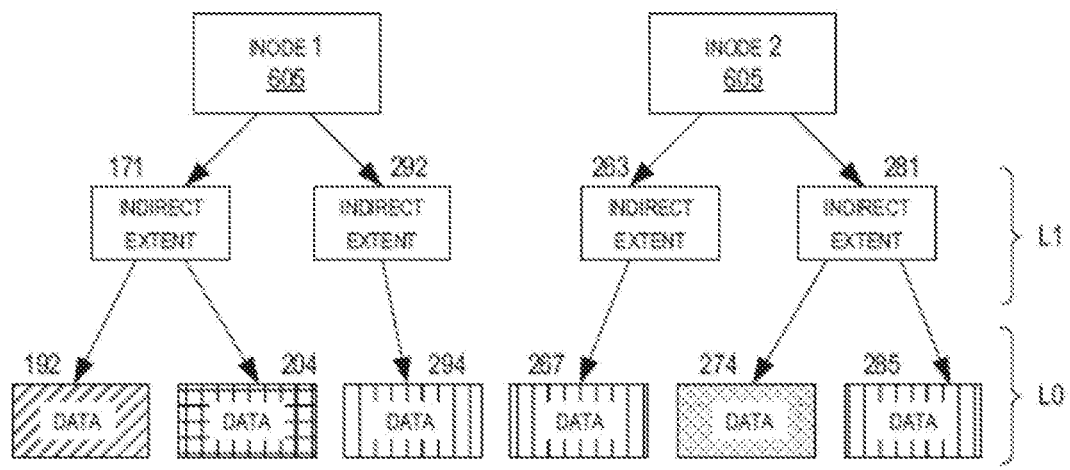
FIGS. 6A and 6B illustrate an example of two buffer trees before and after deduplication, respectively.
Figure 6B:
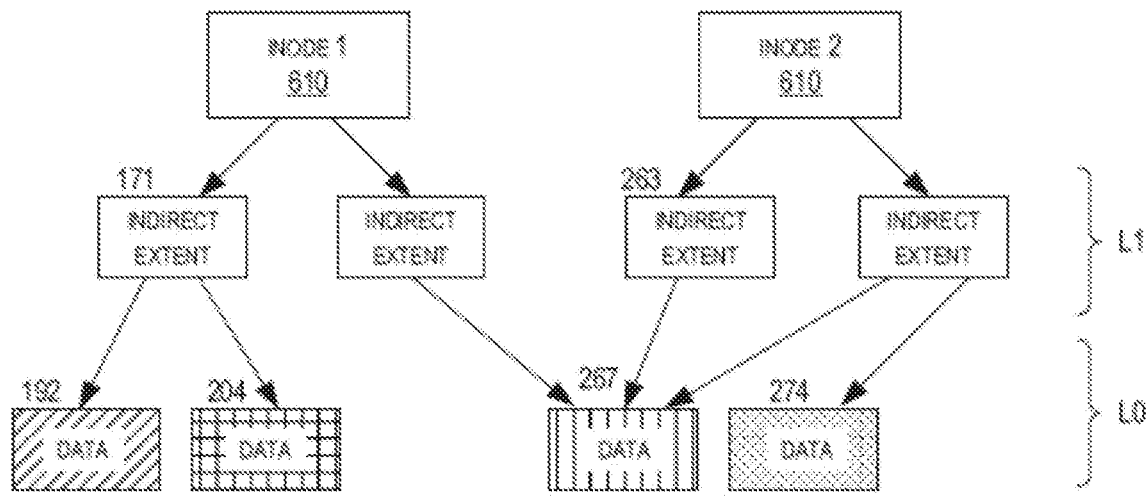

Now consider the process of deduplication. FIGS. 6A and 6B show an example of the buffer trees of two files, where FIG. 6A shows the buffer trees before deduplication and FIG. 6B shows the buffer trees after deduplication. The root extents of the two files are Inode 1 and Inode 2, respectively. The three-digit numerals in FIGS. 6A and 6B are the PVBNs of the various extents. The fill patterns of the direct (L0) extents in these two figures represents the data content of those extents, such that extents shown with identical fill pattern are identical data extents. It can be seen from FIG. 6A, therefore, that the data extents with PVBNs 294, 267 and 285 are identical.

The result of deduplication is that these three data extents are, in effect, coalesced into a single data extent, identified by PVBN 267, which is now shared by the indirect extents that previously pointed to data extent 294 and data extent 285. Further, it can be seen that data extent 267 is now shared by both files. In a more complicated example, data extents can be coalesced so as to be shared between volumes or other types of logical containers. This coalescing operation involves modifying the indirect extents that pointed to data extents 294 and 285, and so forth, up to the root node. In a write out-of-place file system, that involves writing those modified extents to new locations on disk.

To identify duplicate data extents, a hash function, such as MD5, SHA-256 or SHA-512, can be applied to all used (unfree) data extents in the data set to be deduplicated. The output of the hash function is a value for each data extent, called a fingerprint, where identical data extents will always have the same fingerprint. By comparing the fingerprints during a subsequent deduplication process, potential duplicate data extents can be identified (data extents with identical fingerprints are potential duplicates). Once potential duplicate data extents are identified, a byte-by-byte comparison can be done on those data extents to identify actual duplicates, which can then be coalesced. Because the fingerprint of an extent is much smaller than the data extent itself, fingerprints for a very large number of data extents can be stored without consuming a significant portion of the storage capacity in the system.

II. Push-Based Piggyback Pull Technique

As discussed above, a source-driven replication system is more efficient when performing logical replication. This is because the source side (e.g., the source controller) can read the file system from the source side in a logical manner. Conversely, the destination side (e.g., the destination controller) does not have knowledge of the physical layout of the persistent point-in-time images ("snapshots") on the source-side, and thus a destination driven system is less efficient.

In one embodiment, name based replication can be used to logically replicate data in a storage system while preserving storage efficiency. More specifically, the name based replication approach is a source-driven approach that allows the source to transmit shared data extents once (along with the data extent names) and refer to those data extents by name, possibly in multiple file contexts. This helps preserve storage efficiency both in transmission from source to destination and in storage at the destination. This model also decouples the transmission of data extents from the actual files that refer to the data extents. The source has considerable freedom in sending the data extents in an order that it finds convenient.

In one embodiment, name based replication can be used to logically replicate data in a storage system while preserving storage efficiency. Each data extent in the source storage system 720A (hereinafter also called simply "source 720A," "the source," or "the source node") is assigned a name that is unique within a particular scope. In this context, the name is an identifier (ID) other than an indication of the extent's physical location in storage. A name assigned to a data extent can be, for example, the VVBN of the extent, an object ID (01 D), a globally unique ID (GUID), a trusted hash of the extent's contents, etc.

In one embodiment, the source in a replication relationship has two main responsibilities: 1) identifying and sending new data extents, with their names attached, to the destination storage system 720B (hereinafter also called "destination 720B" or simply "the destination") in the replication relationship; and 2) identifying new and modified files and describing the modified contents of files using names. The destination also has two main responsibilities: 1) upon receiving named data extents, inserting/updating entries in its name-to-data-extent map, which is called the "data warehouse" herein; and 2) resolving names using the data warehouse and adding data extents to files as directed by the source.

Figure 7:
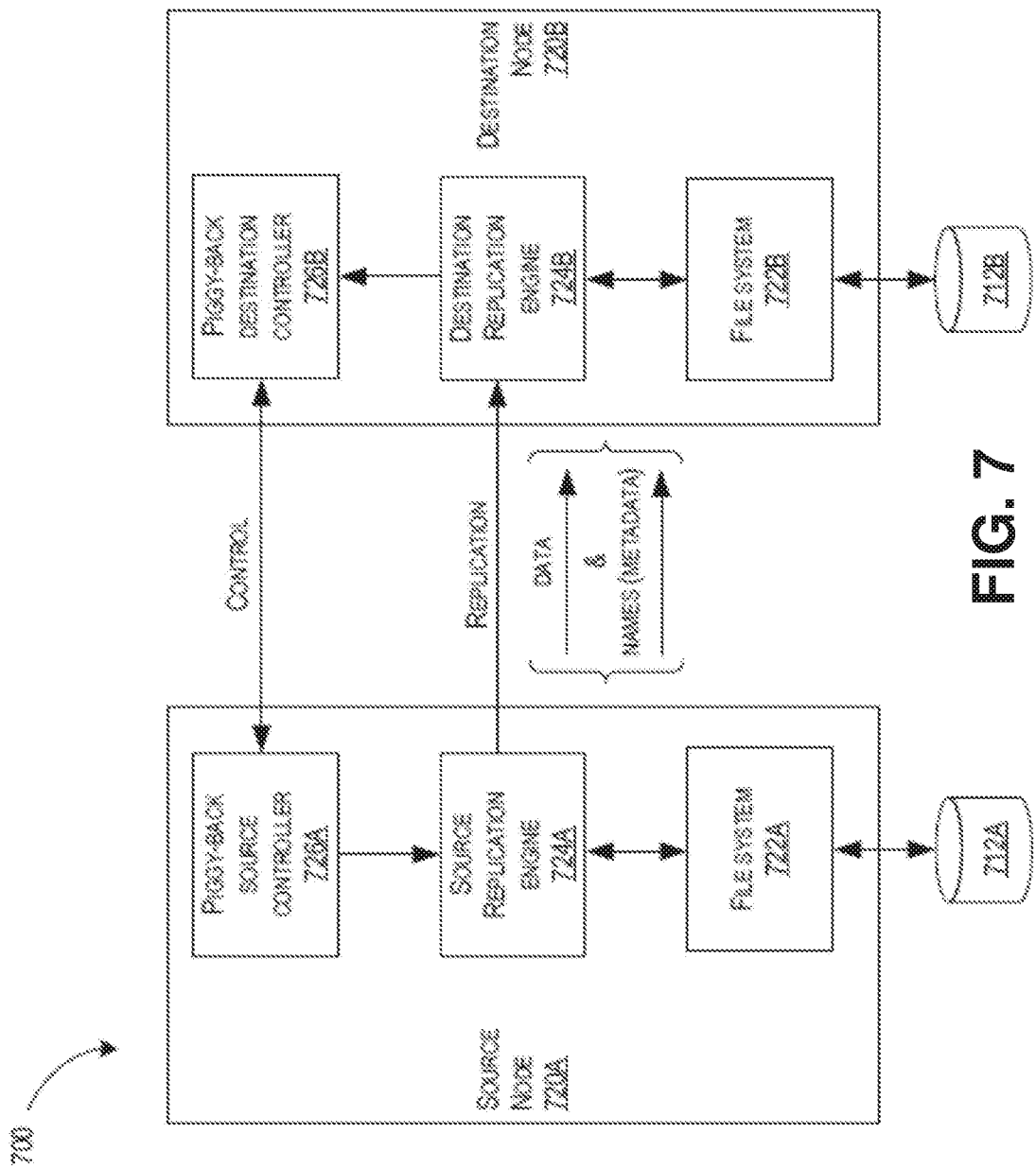
FIG. 7 is a diagram showing an example architecture for piggybacking source-driven logical replication in a network storage environment.

FIG. 7 is a diagram showing an example architecture for piggybacking source-driven logical replication in a network storage environment 700. More specifically, FIG. 7 illustrates an example architecture wherein missing data extents associated with a data set or persistent point-in-time image ("snapshot") are detected and/or otherwise identified at the destination and subsequently pushed from the source.

In FIG. 7 a source node is coupled to a destination node through a network or interconnect (not shown). The source controller 720A includes a file system management module (e.g., source file system 722A), a replication engine 724A, and a piggyback source controller 726A. The destination controller 720B includes a file system management module (e.g., destination file system 722B), a replication engine 724B, and a piggyback source controller 726B. The source controller 720A and the destination controller 720B can be, for example, the source storage controller 110A and the destination storage controller 110B of FIG. 1, respectively, although alternative configurations are possible.

The source replication module 724A in the source storage controller 720A operates in cooperation with a remote replication module 724B in the destination storage controller 720B, to perform logical replication of data stored in the source storage subsystem 115A to destination storage system 115B. In one embodiment, name based replication can be used to logically replicate data in a storage system while preserving storage efficiency. With the name based replication data sets or data streams including the data extents are sent as well as metadata indicating naming information that can be used to by the destination controller 720B to maintain any storage efficiency (deduplication) previously performed by the source controller 720A. The data streams can include, for example, data from base snapshots and/or updated snapshots.

In some cases, one or more missing data extents of a data set may be discovered by the destination side during the logical reconstruction process. The piggyback destination controller 726B identifies these missing data extents. In one embodiment, a destination customer (or destination module) detects the missing data extents during the reconstruction process and indicates the missing data block to the piggyback destination controller 726B. Alternatively or additionally, the missing data extents may be detected by the piggyback destination controller 726B. The logical reconstruction process is the process during which reconstruction of the dataset at the destination occurs. For example, the metadata streams can include information about how a dataset is logically organized. If the metadata stream includes a name of an extent that has not been received at the destination via a data stream, then that extent is said to be missing.

The piggyback source controller 726A operates in cooperation with the piggyback destination controller 726B to perform logical replication of missing data extents. In one embodiment, the piggyback source controller 726A and the piggyback destination controller 726B are designed to operate "on top of" the existing replication engine (e.g., source replication engine 724A and destination replication engine 724B) to make the source replication engine believe that it is initiating the push of any missing data extents.

The source file system 722A is coupled to one or more source volumes 712. Similarly, the destination file system 722B is coupled to one or more destination volumes 712. The source file system 722A and the destination file system 722B read to and write from the source volume 712 and the destination volume 712, respectively The techniques described herein provide for missing extents to be efficiently retrieved at the destination system without major modifications to the push-based replication system. More specifically, a push-based piggyback pull model is described that allows the piggyback destination controller 726B to respond to periodic push inquiries from the piggyback source controller 726A. The push inquiry response includes an indication of the missing data extents. For example, in one embodiment, the push inquiry response can include the names of the missing data extents.

Missing data extents can occur in a push-based logical replication system in any number of ways. For example, "Zombie" is a name describing a condition that can occur in some file systems as a result of delete optimization. To optimize performance when a file is deleted, the file system may not delete all of the extents from disks immediately. Rather, the file system indicates to the client that the file has been deleted, while slowly processing the delete of the extents in the background. Zombie is a condition in which some deleted extents are still captured in a snapshot, which can confuse the replication engine 724A in deciding which extents should be included in the replication transfer. The confusion at the replication engine 724A can result in the source side not sending (or pushing) one or more active (i.e., non-deleted) extents. The destination side determines or otherwise identifies that some of data the extents missing, and can utilize the techniques described herein to allow the missing extents to be efficiently obtained at the destination controller 726B.

Figure 8:
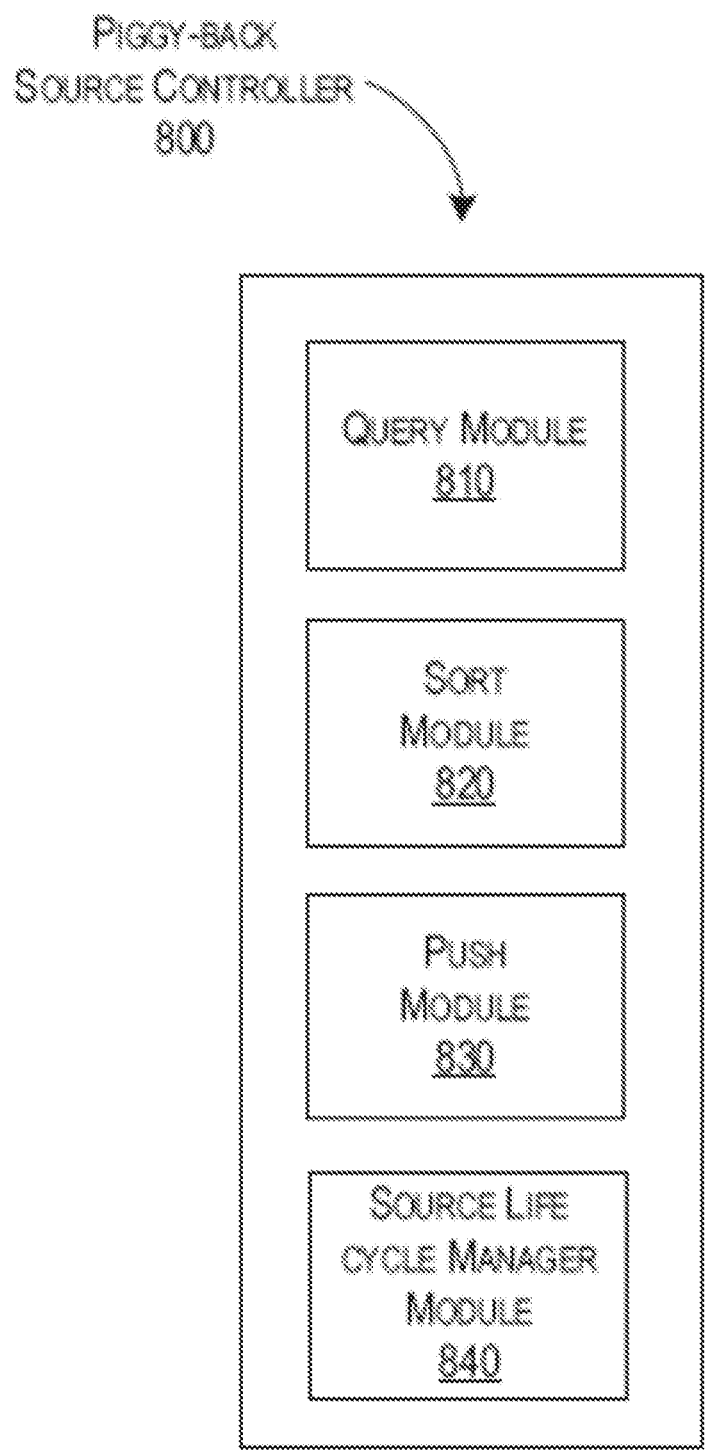
FIG. 8 is a diagram showing an example of a piggyback source controller.

FIG. 8 is a diagram showing an example piggyback source controller 800. The piggyback source controller 800 may be the source controller 726A of FIG. 7, although alternative configurations are possible. In the example of FIG. 8, the piggyback source controller 800 includes a query module 810, a sort module 820, a push module 830, and a source life cycle manager module 840. More or fewer modules are possible.

The query module 810 is configured to generate and send push inquiries from the piggyback source controller to the piggyback destination controller. The push inquires may be sent periodically (e.g., every 0.5 seconds).

The sort module 820 is configured to sort the extent indicators (e.g., extent names) that are received in the extent inquiry responses. Sorting the extent indicators increases the efficiency of reading the missing extents from the source file system. The extent indicators are then grouped and/or otherwise sorted into sequential chunks. For example, the extent indicators may be grouped into 16-extent chunks. The sorting module can increase the reading efficiency by having the extents sorted by VVBN before reading. In one embodiment, the sort algorithm sorts in O(N*log N), where N is some integer. In one embodiment, the sort module 820 sorts the extents by VVBN. However, the extents may be sorted according to any algorithm that increases the read efficiency.

The push module 830 is configured to read the sorted missing data extents from the file system and push the extents with the extent indicators (or names) to the destination controller. In one embodiment, the extent indicators (or names) may be sent with the data extents. In other embodiments, the extent indicators (or names) may be sent separately from the data extents. Additionally the push module 830 may generate a trigger to the source replication engine 724A indicating the sorted missing data extents. In this case, the source replication engine accesses or otherwise reads the missing data extents from the source volume 712 using the location information in the file system 722A.

In one embodiment, the missing data extents that are pushed to the destination side are marked with a special flag indicating that these extents were essentially requested by the piggyback destination controller. Operation of the piggyback destination controller is discussed in greater detail with reference to FIG. 9.

The source life cycle manager module 840 controls the timing for the piggy-back source controller 800. For example, the source life cycle manager module 840 can control when the piggy-back source controller 800 starts and stops and the timing interface with the rest of the source node.

Figure 9:
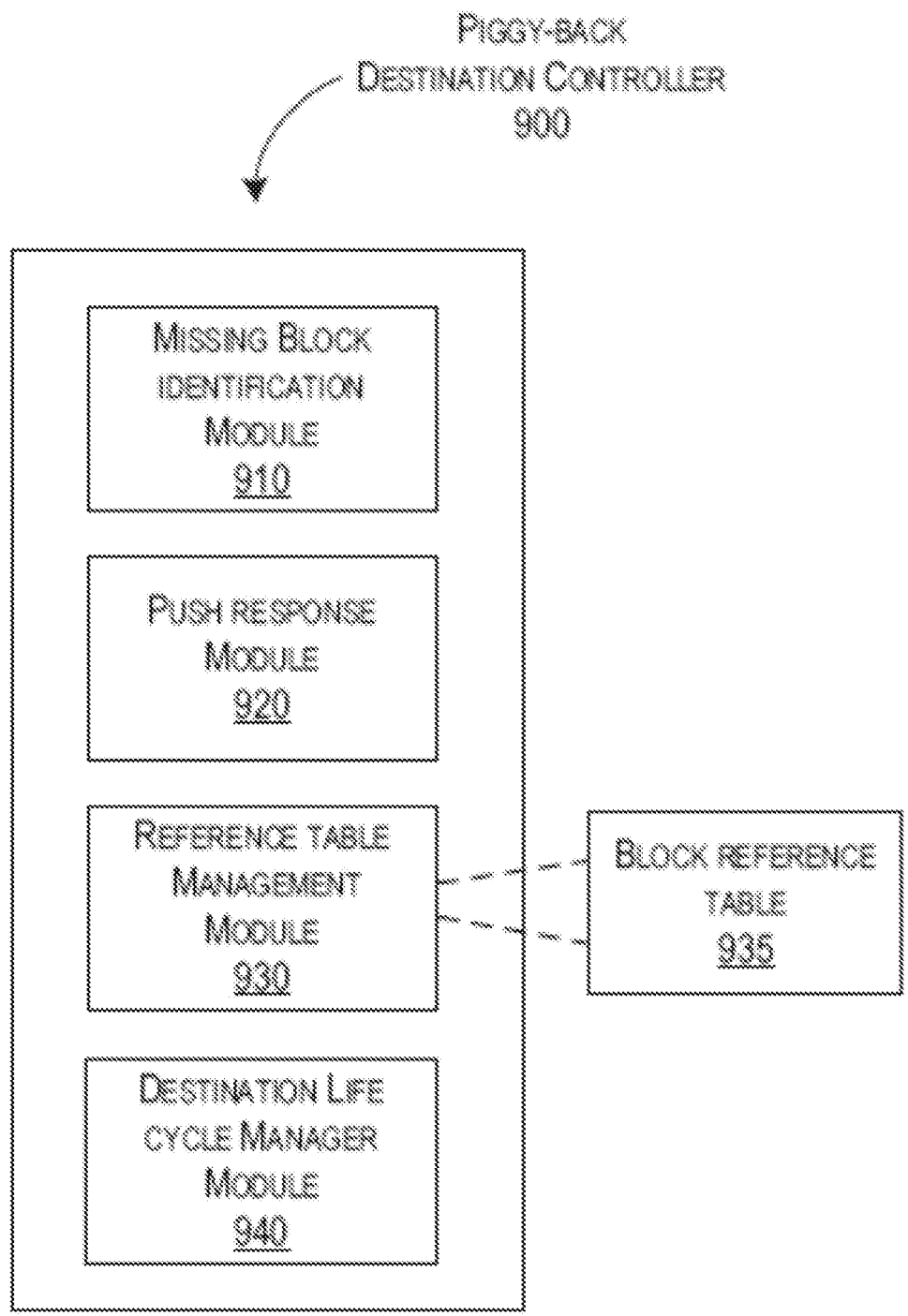
FIG. 9 is a diagram showing an example of a piggyback destination controller.

FIG. 9 is a diagram showing an example of piggyback destination controller 900. The piggyback destination controller 900 may be the destination controller 726B of FIG. 7, although alternative configurations are possible. In the example of FIG. 9, the piggyback source controller 900 includes a missing extent identification module 910, a push response module 920, a reference table management module 930, and a destination life cycle manager module 940. More or fewer modules are possible.

The missing extent identification module 910 is configured to identify and/or otherwise detect missing data extents of a data set (i.e., baseline snapshot or update snapshot).

The push response module 920 is configured to respond to push inquiry requests from the source controller with the missing data extents, if any.

The reference table management module 930 is configured to manage entries in the extent reference table (or dictionary) 935. The reference table management module 930 maintains the extent reference table 935 to avoid pulling and/or otherwise requesting the same extents more than once. The extent reference table 935 may comprise a indicators (or names) of the extents that were requested and/or otherwise pulled or indicated to the source controller. The extent reference table 935 is maintained to be quickly searchable. In one embodiment, the extent reference table 935 is maintained for searching in O(log N), where N is some integer. O(log N) is "Big 0" notation which is useful when analyzing the efficiency of algorithms in computer science. More specifically, "Big 0" notation characterizes functions according to their growth rates: different functions with the same growth rate may be represented using the same 0 notation.

In one embodiment, the extents may be sorted and identified by VVBN. However, the extents may be identified according to any indicator that allows for efficient searching and avoids multiple pushes of the same data extents.

The destination life cycle manager module 940 is configured to control the timing for the piggy-back destination controller 900. For example, the destination life cycle manager module 940 can control when the piggy-back destination controller 900 starts and stops and the timing interface with the rest of the destination node.

Figure 10:
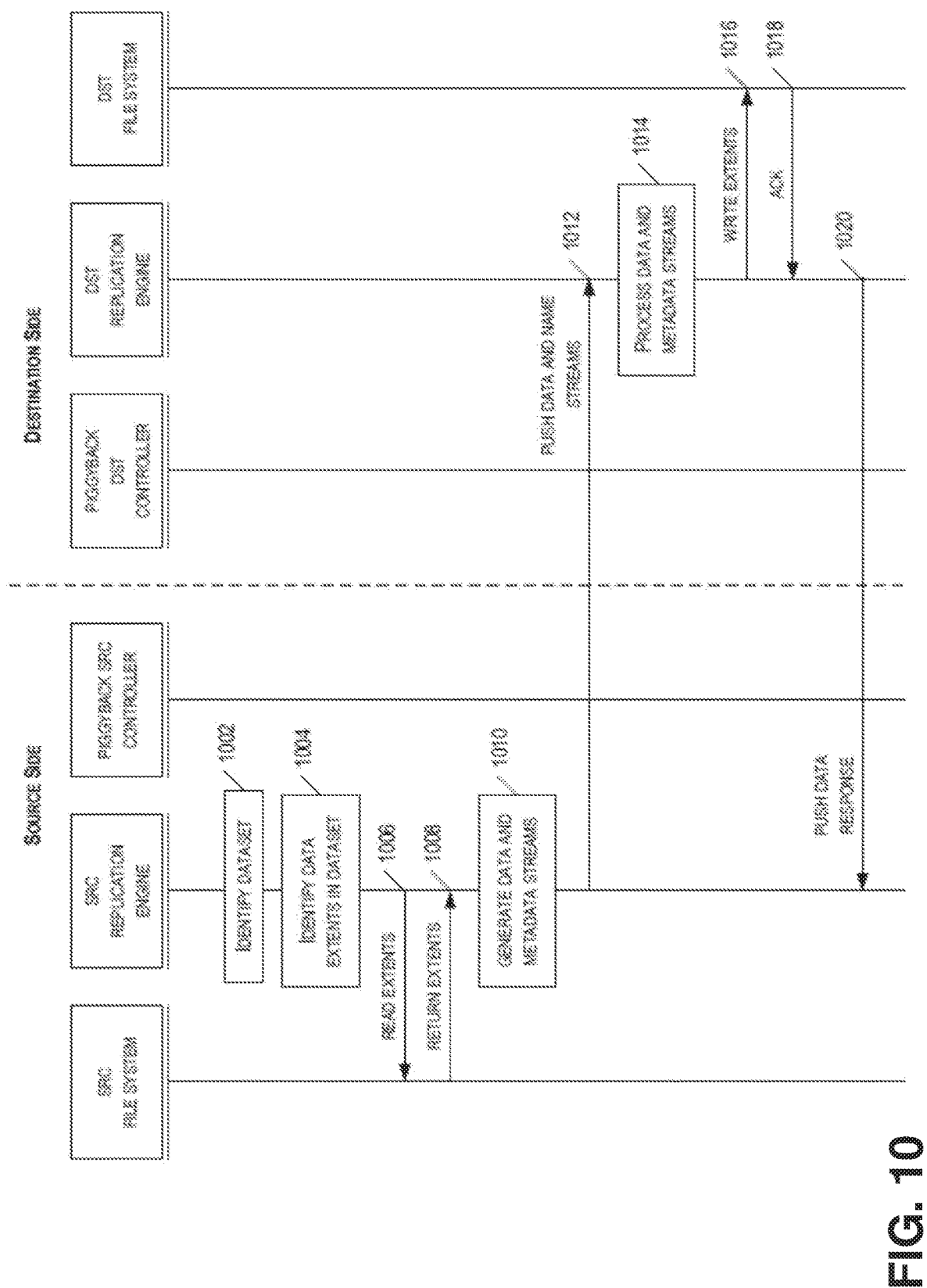
FIG. 10 is a sequence diagram illustrating an example of source-based replication in a network storage environment.

FIG. 10 is a sequence diagram illustrating an example of source-based replication in a network storage environment. More specifically, the example of FIG. 10 illustrates a data set (or snapshot) transfer from the source side to a destination side. Although not explicitly shown, the "source side" can be embodied by a source storage controller or node and the destination side can be embodied by a destination storage controller or node.

As shown, the source side includes a source file system, a source replication engine, and a piggyback source controller. The source file system, source replication engine, and piggyback source controller may be the file system module 722A, source replication module 724A, and piggyback source controller 726A of FIG. 7, respectively, although alternative configurations are possible. Similarly, the destination side includes a destination file system, a destination replication engine, and a piggyback destination controller. The destination file system, destination replication engine, and piggyback destination controller may be the file system module 722B, destination replication module 724B, and piggyback destination controller 726B of FIG. 7, respectively, although alternative configurations are possible.

To begin, at step 1002, the source replication engine identifies a data set to replicate. For example, the data set may be a baseline snapshot or an incremental (or update) snapshot. The source replication engine, at step 1004, then identifies all of the extents in the data set. For example, in the case of an incremental snapshot, the source replication engine may identify only the new and modified extents. Once the extents for the data set are identified, the source replication engine then reads the extents at step 1006 from the source file system and receives the extents at step 1008. Although not shown, in one embodiment, the source replication engine accesses or otherwise reads the missing data extents from a source volume (not shown) using the location information in the file system.

At step 1010, the source replication engine generates data stream containing the data and the metadata streams containing the metadata (e.g., source names and offsets within a file or inode for all of the files in the snapshot). The source replication engine then pushes or otherwise sends the data and meta data streams to the destination side and, at step 1012, the destination replication engine receives the data and the metadata streams. The source replication engine may send the data and the metadata streams together and/or independently.

In the example of FIG. 10, the data and metadata streams are not flagged with a piggyback flag because the data and metadata streams occur as part of the normal replication process. However, in some embodiments, the data and metadata streams may be flagged with the piggyback flag. Although not shown, in one embodiment, the piggyback destination controller may receive the push streams and process the streams to determine if the push includes a piggyback flag. If the piggyback flag is not included, the piggyback destination controller forwards the streams on to the destination replication engine. Otherwise if the piggyback flag is included, the piggyback destination controller realizes that the extent extents and metadata were pushed as part of the push-based piggyback pull technique. Alternatively or additionally, the destination replication engine can receive the push streams and process the streams to determine if the push includes a piggyback flag. In this case, if the piggyback flag is included, the destination replication engine forwards the streams to the piggyback destination controller.

At step 1014, the destination replication engine processes the data and metadata streams, writes the extents to the destination volume using information in the destination file system at step 1016 and receives ack(s) for the write(s) at step 1018. Lastly, at step 1020, the destination replication engine sends a response or notification to the source replication engine that the data and metadata streams have been received. Step 1020 can occur prior to and/or concurrently with steps 1016 and/or 1018 in some embodiments. Although not shown, once the data sets have been written to the file system, a destination customer module can then access and attempt to logically reconstruct the data set. As discussed, logically reconstructing the data set is the process of utilizing the metadata and the data streams to build the data set at the destination. The metadata includes information about the logical layout on the source side and thus, when reconstructed, the data set maintains any storage efficiency (i.e., deduplication) that was applied to the dataset at the source.

Figure 11:
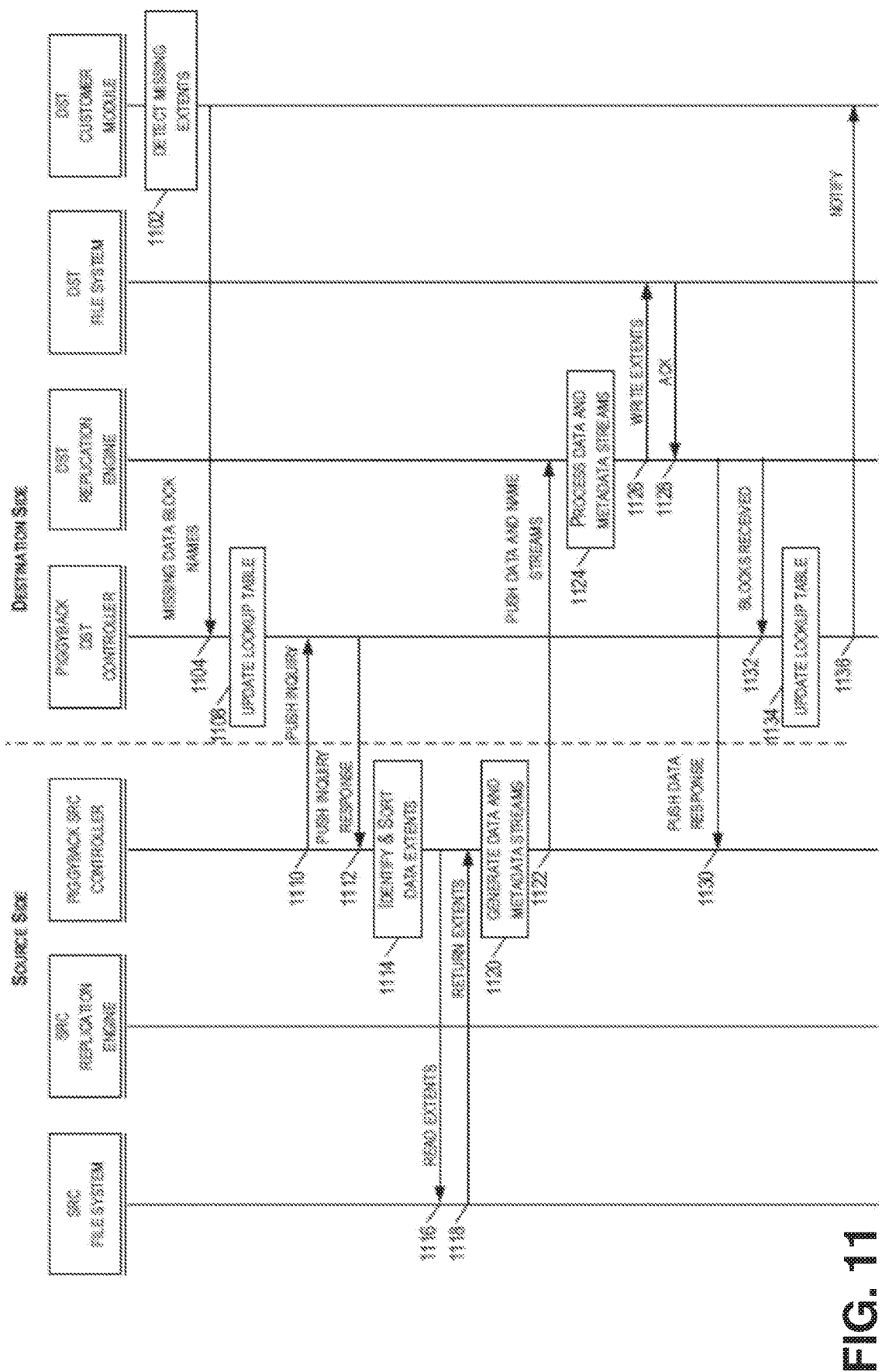
FIG. 11 is a sequence diagram illustrating an example of the push based piggyback pull technique discussed herein.

FIG. 11 is a sequence diagram illustrating an example of the push-based piggyback technique discussed herein. More specifically, the example of FIG. 11 illustrates use of the push-based piggyback technique for receiving a push of missing data extents at a destination side. Although not explicitly shown, the "source side" can be embodied by a source storage controller or node and the destination side can be embodied by a destination storage controller or node.

As shown, the source side includes a source file system, a source replication engine, and a piggyback source controller. The source file system, source replication engine, and piggyback source controller may be the file system module 722A, source replication module 724A, and piggyback source controller 726A of FIG. 7, respectively, although alternative configurations are possible. Similarly, the destination side includes a destination file system, a destination replication engine, and a piggyback destination controller. The destination file system, destination replication engine, and piggyback destination controller may be the file system module 722B, destination replication module 724B, and piggyback destination controller 726B of FIG. 7, respectively, although alternative configurations are possible. The destination customer module can be any destination side module that may detect and need to acquire missing one or more missing data extents from a data set.

To begin, a data set has been written to the destination file system as illustrated in FIG. 10. The destination customer module then attempts access and logically reconstruct the data set. At step 1102, the destination customer module detects one or more missing data extents during logical reconstruction. At step 1104, the destination customer module transfers and indication of the missing extents names to the piggyback destination controller. The transfer may include a callback request, identification of the missing extent(s), and/or an operation (or customer module) identifier. The callback request is a request to be notified when the missing data extents are received and accessible at the destination. The piggyback destination controller then, at step 1108 updates the lookup table. For example, the table may be updated and sorted with the VVBNs associated with the missing data. If a missing extent has already been requested then that extent may be marked in the table as requested so that it is not requested a second time.

At step 1110, the piggyback source controller generates and transfers a push inquiry to the piggyback destination controller. As discussed above, the piggyback destination controller may transfer the push inquiry periodically (e.g., every 0.5 seconds). At step 1112, the piggyback destination controller responds with a push inquiry response that indicates one or more missing data extents. The source piggyback controller then processes the push inquiry response to identify any missing extents and sorts the extents at step 1114. As discussed, the extents name be sorted by name (e.g., by VVBN, etc.).

Once the missing extents for the data set are identified, the source piggyback controller then reads the extents at step 1116 from the source file system and receives the extents at step 1118. Although not shown, in some embodiments, the source piggyback controller may alternatively send an indication to the source replication engine to perform steps 1116 and 1118. In this case, the source replication engine and/or the piggyback source controller then perform steps 1120 and 1122. Otherwise, the piggyback source controller generates data and metadata streams at step 1120. In one embodiment, the piggyback source controller adds a piggyback flag to the data and/or the metadata streams and, at step 1122, pushes the data and metadata streams to the destination replication engine.

At step 1124, the destination replication engine processes the data and metadata streams, writes the extents to the destination volume using information in the destination file system at step 1126 and receives ack(s) for the write(s) at step 1128. At step 1130, the destination replication engine sends a response or notification to the source replication engine that the data and metadata streams have been received. At step 1132 the destination replication engine sends a notification that the missing extents have been received. At step 1134, the lookup table is updated to reflect that the missing extents have been received. Alternatively or additionally, the lookup table may be accessed to determine whether additional missing extents for the customer are need prior to notifying the destination customer that all of the missing extents have been received. Lastly, if all of the missing data extents have been received at the destination, at step 1136, the piggyback destination controller generates and sends a notification to the destination customer module indicating that the reconstruction of the data set can commence.

Figure 12:
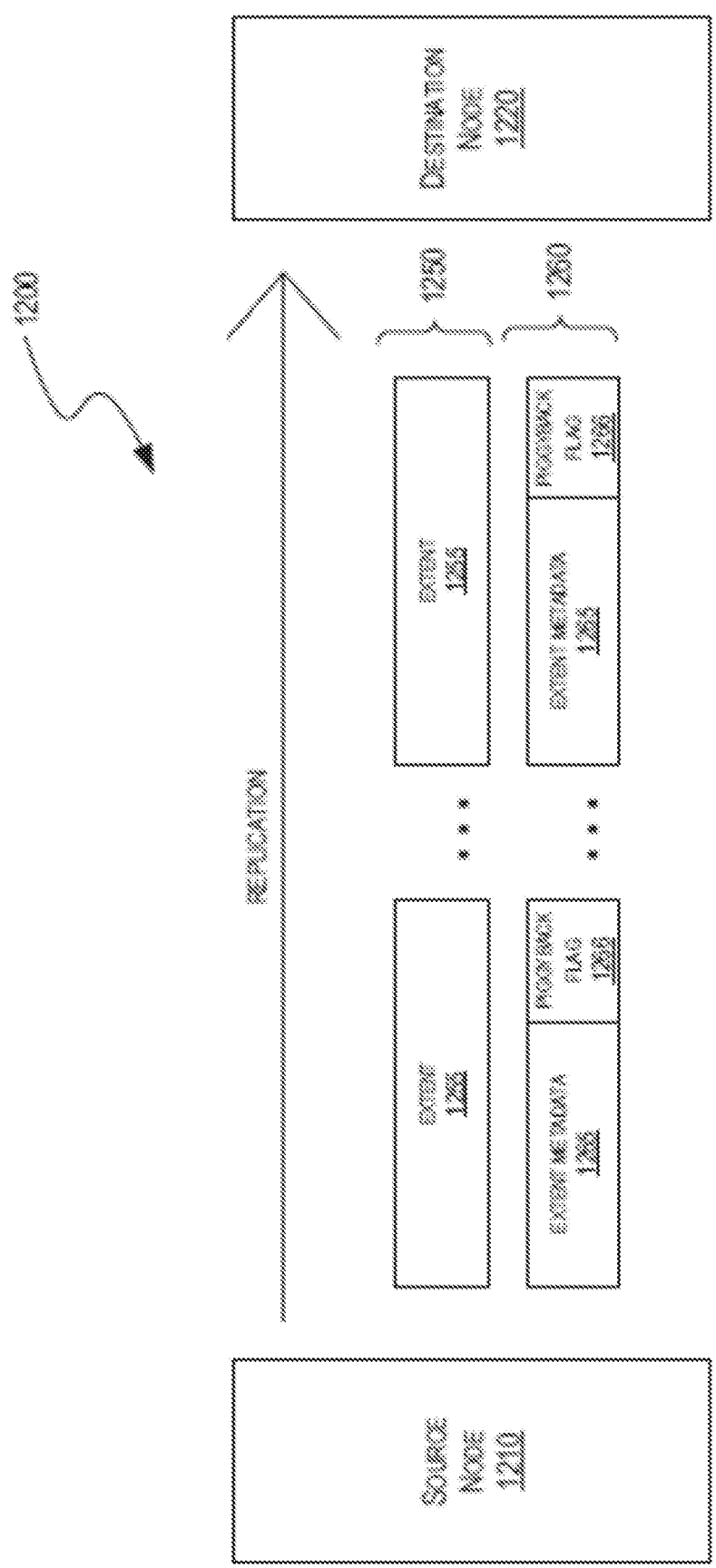
FIG. 12 is a diagram showing example data set replication by way of a data stream and a metadata stream including a piggyback flag in a network storage environment.

FIG. 12 is a diagram showing example of data set replication by way of a data stream and a metadata stream having a piggyback flag in a network storage environment 1200. More specifically, FIG. 12 illustrates an example of replicating a data set from a source node 1210 to a destination node 1220. The data set may be a persistent point-in-time image ("snapshot") that is pushed from the source node 120 via a data stream 1250 and a metadata stream 1260. The data stream includes a plurality of extents 1255. The metadata stream includes a plurality of metadata 1265 that corresponds to the data stream 1250. In one embodiment, the data stream is sent concurrently with the metadata stream. In other embodiments, the streams may be sent serially.

As shown in this example, the metadata stream includes a piggyback flag 1266. The piggyback flag 1266 indicates whether the extent 1255 was requested via a push inquiry response. As discussed with respect to FIGS. 10 and 11, the piggyback flag 1266 can be used in the processing of data extents to, for example, indicate to a piggyback destination controller that the extent and metadata has been received at the destination. Although the piggyback flag 1266 is shown as included in the metadata stream 1260, the piggyback flag 1266 may be alternatively or additionally included in the data stream 1250.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, or other similar device(s); or c) a combination of the forms mentioned in a) and b).

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method comprising:
   identifying data extents of a data set to logically replicate from a first node to a second node;

identifying metadata indicating naming information for the data set;

performing name based replication to replicate the data extents and the metadata from the first node to the second node for logically replicating the data set from the first node to the second node;

evaluating a push inquiry response from the second node to identify missing data extents detected by the second node during a logical reconstruction of the data set; and reading and sorting, by the first node, the missing data extents by virtual volume block number to create a sorted set of data extents that are transmitting to the second node for resuming the logical reconstruction of the data set.

2. The method of claim 1, wherein identifying data extents comprises:

identifying a data extent as being associated with a data stream.

3. The method of claim 1, wherein the naming information is utilized to retain storage efficiency provided by the first node for the data set.

4. The method of claim 1, wherein the naming information is utilized to retain data deduplication provided by the first node for the data set.

5. The method of claim 1, wherein a data extent is associated with a data stream comprising data from a base snapshot.

6. The method of claim 1, wherein a data extent is associated with a data stream comprising data from an updated snapshot.

7. The method of claim 1, wherein the naming information is utilized to preserve sharing of extents provided by the first node for the data set.

8. A non-transitory computer readable storage medium having instructions stored thereon, which when executed by a processor of a machine, causes the machine to:

identify data extents of a data set to logically replicate from a first node to a second node;

identify metadata indicating naming information for the data set;

perform name based replication to replicate the data extents and the metadata from the first node to the second node for logically replicating the data set from the first node to the second node;

evaluate a push inquiry response from the second node to identify missing data extents detected by the second node during a logical reconstruction of the data set; and read and sort, by the first node, the missing data extents by virtual volume block number to create a sorted set of data extents that are transmitting to the second node for resuming the logical reconstruction of the data set.

9. The non-transitory computer readable storage medium of claim 8, wherein the instructions cause the machine to:

identifying a data extent as being associated with a data stream.

10. The non-transitory computer readable storage medium of claim 8, wherein the naming information is utilized to retain storage efficiency provided by the first node for the data set.

11. The non-transitory computer readable storage medium of claim 8, wherein the naming information is utilized to retain data deduplication provided by the first node for the data set.

12. The non-transitory computer readable storage medium of claim 8, wherein a data extent is associated with a data stream comprising data from a base snapshot.

13. The non-transitory computer readable storage medium of claim 8, wherein a data extent is associated with a data stream comprising data from an updated snapshot.

14. The non-transitory computer readable storage medium of claim 8, wherein the naming information is utilized to preserve sharing of extents provided by the first node for the data set.

15. A computing device, comprising:

a memory having stored thereon instructions for performing a method; and a processor coupled to the memory, the processor configured to execute the instructions to cause the processor to:

identify data extents of a data set to logically replicate from a first node to a second node;

identify metadata indicating naming information for the data set;

perform name based replication to replicate the data extents and the metadata from the first node to the second node for logically replicating the data set from the first node to the second node;

evaluate a push inquiry response from the second node to identify missing data extents detected by the second node during a logical reconstruction of the data set; and read and sort, by the first node, the missing data extents by virtual volume block number to create a sorted set of data extents that are transmitting to the second node for resuming the logical reconstruction of the data set.

16. The computing device of claim 15, wherein the instructions cause the processor to:

identifying a data extent as being associated with a data stream.

17. The computing device of claim 15, wherein the naming information is utilized to retain storage efficiency provided by the first node for the data set.

18. The computing device of claim 15, wherein the naming information is utilized to retain data deduplication provided by the first node for the data set.

19. The computing device of claim 15, wherein a data extent is associated with a data stream comprising data from a base snapshot.

20. The computing device of claim 15, wherein a data extent is associated with a data stream comprising data from an updated snapshot.

* * * * *